United States Patent [19]

Davis

[11] Patent Number: 4,774,844

[45] Date of Patent: Oct. 4, 1988

[54] ENCAPSULATED ELECTROMAGNETIC FLOWMETER

[75] Inventor: James W. Davis, New Britain, Pa.

[73] Assignee: Fischer & Porter Co., Warminster, Pa.

[21] Appl. No.: 66,756

[22] Filed: Jun. 25, 1987

[51] Int. Cl.[4] .................................................. G01F 1/58
[52] U.S. Cl. .................................................... 73/861.12
[58] Field of Search ....................................... 73/861.12

[56] References Cited

U.S. PATENT DOCUMENTS

| | | | |
|---|---|---|---|
| 4,181,018 | 1/1980 | Schmoock | 73/861.12 |
| 4,186,600 | 2/1980 | Appel et al. | 73/861.12 |
| 4,281,552 | 8/1981 | Nissen et al. | 73/861.12 |
| 4,358,963 | 10/1982 | Schmoock | 73/861.12 |
| 4,567,775 | 2/1986 | Schmoock | 73/861.12 |

*Primary Examiner*—Michael J. Tokar
*Assistant Examiner*—Robert P. Bell
*Attorney, Agent, or Firm*—Michael Ebert

[57] ABSTRACT

An electromagnetic flowmeter having a frame assembly formed by an octagonal metal frame within which are mounted a pair of electromagnets and a pair of electrode holders. The electromagnets are secured to one set of opposing sides of the frame along a first transverse axis which passes through the geometric center of the frame while the holders are secured to another set of opposing sides along a second tranverse axis which passes through the center at right angles to the first axis. The frame assembly is encapsulated within a generally cylindrical plastic insulating body of polymeric material having a longitudinal bore therein defining a flow conduit whose flow axis passes through the geometric center of the frame and is perpendicular both to the first and second transverse axes whereby when the fluid flows therethrough it intersects the magnetic lines of flux produced by the electromagnets. The resultant voltage induced in the fluid is a function of its flow rate and is picked up by the electrodes to provide a flow rate signal. To prevent the plastic body from cracking as a result of differences between the thermal coefficient of expansion of the metal frame and that of the polymeric material, an interfacial layer is formed therebetween having elastomeric properties.

11 Claims, 2 Drawing Sheets

ENCAPSULATED ELECTROMAGNETIC FLOWMETER

BACKGROUND OF INVENTION

1. Field of Invention:

This invention relates generally to electromagnetic flowmeters, and more particularly to a flangeless flowmeter whose components are encapsulated within a cast epoxy resin body that defines the flow conduit of the meter to form a highly compact, low-cost unit that may be readily installed in a flow line.

2. Status of Prior Art:

Magnet flowmeters such as those disclosed in U.S. Pat. Nos. 3,695,104, 3,824,856, 3,783,687 and 3,965,738, are especially adapted to measure the volumetric flow rates of fluids which present difficult handling problems, such as corrosive acids, sewage and slurries. Because the instrument is free of flow obstructions, it does not tend to plug or foul.

In a magnetic flowmeter, an electromagnetic field is generated whose lines of flux are mutually perpendicular to the longitudinal axis of the flow tube through which the fluid to be metered is conducted and to the transverse axis along which the electrodes are located at diametrically-opposed positions with respect to the tube. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instanteous value of the voltage established at the electrodes.

Typical of commercially-available flanged electromagnetic flowmeters is that unit manufactured by Fischer & Porter Co. of Warminster, Pa., whose Model 10D1430 flowmeter is described in Instruction Bulletin 10D1430A-1 Revision 4. This meter consists of a carbon-steel pipe spool flanged at both ends and serving as a meter body. Saddle-shaped magnetic coils are fitted on opposite sides of the inner surface of the meter body, the magnetically-permeable pipe spool acting as a core or return path for the magnetic field generated by these coils.

Disposed at diametrically-opposed positions within the central portion of the meter body are two cylindrical electrodes that are insulated from the pipe, the faces of the electrodes being flush with the inner surface of the pipe and coming in contact with the fluid to be metered. Connected to these electrodes and housed in a box external to the pipe are calibration components and a pre-amplifier.

In installing a standard flanged magnetic flowmeter, the meter is interposed between the upstream and downstream pipes of a fluid line, each pipe having an end flange. The mounting flanges on the meter are bolted to the flange of line pipes. It is, of course, essential that the circle of bolt holes on the mounting flanges of the meter match those on the pipe flanges.

In a magnetic flowmeter, the flow tube is subject to the same fluid pressure as the line pipes. The flow tube must therefore be of a material and of a thickness sufficient to withstand this pressure, even though the strength of the flow tube is unrelated to its measuring function. This design factor contributes significantly to the cost of a standard meter. Existing meters of the above-described type which are made up of components that must be assembled are generally of substantial size and weight and quite expensive to manufacture.

To overcome the drawbacks of a flanged electromagnetic flowmeter, the 1978 Schmoock U.S. Pat. No. 4,098,118 discloses a highly compact unit interposable between the flanged ends of upstream and downstream pipes in a line to meter fluid passing through the line. In one embodiment disclosed in the patent the flowmeter is constituted by an outer ferromagnetic ring having a pair of electromagnet coils supported therein at opposed positions along a diametrical axis normal to the longitudinal axis of the ring, the longitudinal axis passing through the central flow passage of an annular pressure vessel.

The vessel, which is formed of high-strength insulating material, is molded within the ring and encapsulates the coils as well as a pair of electrodes disposed at diametrically-opposed positions with respect to the flow passage along a transverse axis at right angles to the coil axis to define a unitary structure. The unit is compressible between the end flanges of the pipes by bridging bolts that pass through bore holes formed in the pressure vessel or which lie outside the outer ring to encage the unit.

Also disclosed in the Schmoock patent is a flangeless flowmeter which dispenses with the outer metal ring and makes use instead of a cylindrical plastic spool that forms the flow conduit of the meter and is surrounded by a reinforcing metal sleeve. An insulating body of synthetic plastic material is molded about this spool and embedded in this body are electrode holders and electromagnets which cooperate with the spool. Also embedded in this insulating body are ferromagnetic straps that interconnect the cores of the electromagnets to form a magnetic return path therefor. This return path in the case of the embodiment having an outer ferromagnetic ring is provided by the ring itself.

A ringless flowmeter of the Schmoock type is relatively difficult and expensive to make, particularly since prior to molding of the insulating body, the electrode holders and the electromagnets are unsupported and means therefore must be provided to hold these components in their assigned positions during the molding operation.

SUMMARY OF INVENTION

In view of the foregoing, the main object of this invention is to provide an improved flangeless flowmeter in which the electromagnets and the electrode holders are encapsulated within a cylindrical insulating body having a bore therein defining the flow conduit of the meter.

More particularly, an object of the invention is to provide a meter of the above-type in which the electromagnets and the electrode holders are supported within a ferromagnetic frame to create a frame assembly which is fully encapsulated in the body, the frame also acting as a magnetic return path for the electromagnets.

Still another object of the invention is to provide a low cost yet efficient encapsulated flowmeter of the above-type which is relatively easy to mold.

A significant feature of the invention resides in an interfacial layer between the frame and the molded body, the layer having elastomeric properties to permit environmental thermal cycling throughout a broad temperature range without cracking the body.

Briefly stated, these objects are attained in an electromagnetic flowmeter having a frame assembly formed by an octagonal metal frame within which are mounted a pair of electromagnets and a pair of electrode holders. The electromagnets are secured to one set of opposing sides of the frame along a first transverse axis which passes through the geometric center of the frame while the holders are secured to another set of opposing sides along a second transverse axis which passes through the center at right angles to the first axis. The frame assembly is encapsulated within a generally cylindrical plastic insulating body of polymeric material having a longitudinal bore therein defining a flow conduit whose flow axis passes through the geometric center of the frame and is perpendicular both to the first and second transverse axes whereby when fluid flows therethrough it intersects the magnetic lines of flux produced by the electromagnets. The resultant voltage induced in the fluid is a function of its flow rate and is picked up by the electrodes to provide a flow rate signal. To prevent the plastic body from cracking as a result of differences between the thermal coefficient of expansion of the metal frame and that of the polymeric material, an interfacial layer is formed therebetween having elastomeric properties.

OUTLINE OF THE DRAWINGS

For a better understanding of the invention as well as other objects and further features thereof, reference is made to the following detailed description to be read in conjunction with the accompanying drawings wherein:

FIG. 3 is a transverse section taken through the frame assembly and the insulating body in which it is encapsulated;

FIG. 4 illustrates, in section, the interfacial layer between the frame and the insulating body;

FIG. 5 illustrates the manner in which the flangeless meter is installed between upstream and downstream pipes of a process line;

FIG. 6 illustrates an alternative form of electromagnet; and

FIG. 7 illustrates the essential components of a second embodiment.

DESCRIPTION OF INVENTION

The Basic Structure

Figure 1:
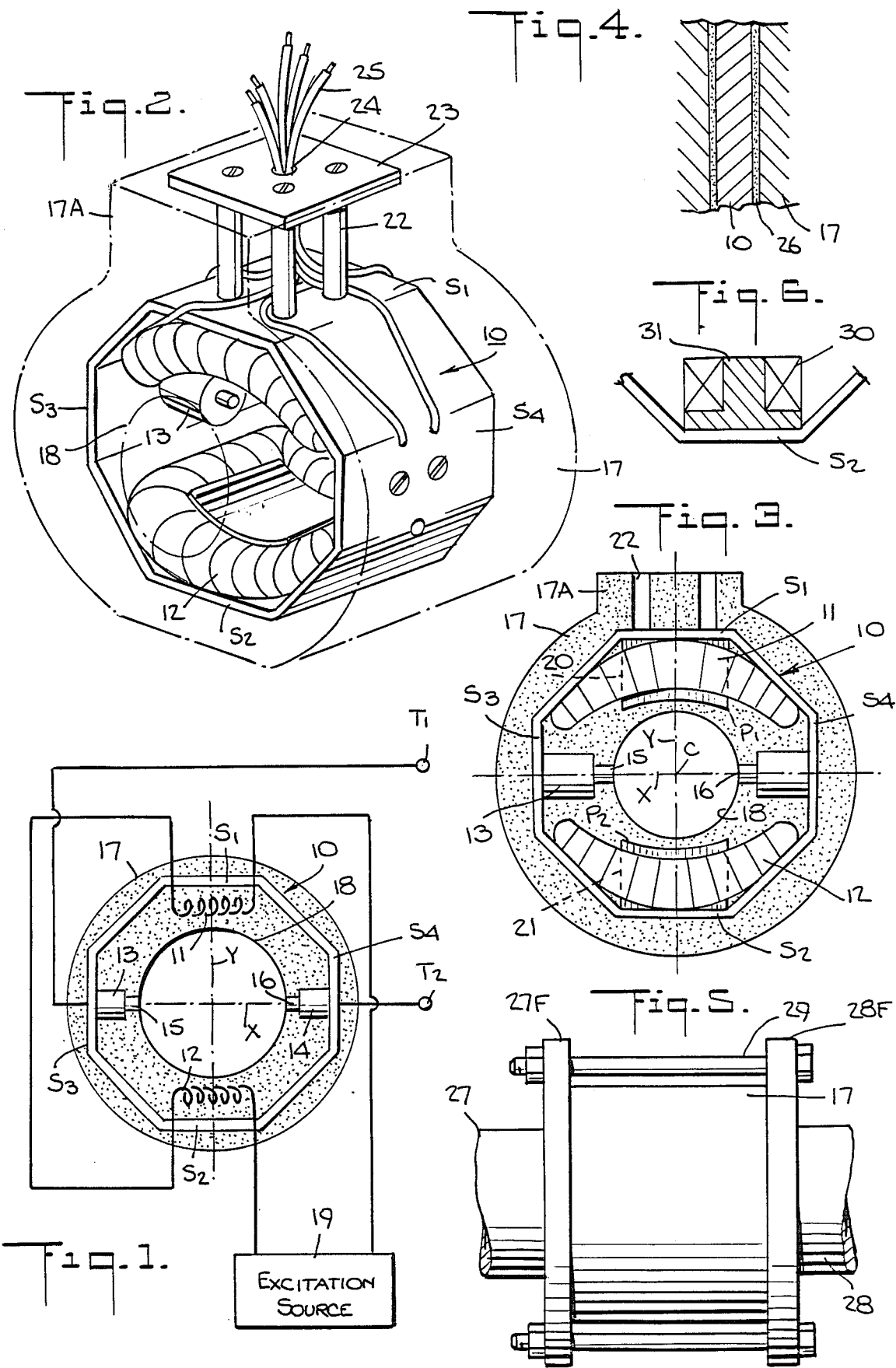
FIG. 1 is a schematic diagram showing the essential components of a first preferred embodiment of a flangeless electromagnetic flowmeter in accordance with the invention.

Referring now to FIG. 1 which is a schematic representation of a flangeless electromagnetic flowmeter in accordance with the invention, the meter includes an octagonal metal frame 10 made of ferromagnetic material such as iron or steel. In practice, the frame may be fabricated of sheet metal stampings which are welded or bolted together.

Mounted within the frame on one set of opposing sides $S_1$ and $S_2$ along a transverse axis Y which passes through the geometric center C of the frame is a pair of electromagnets 11 and 12. Also mounted within the frame on another set of opposing sides $S_3$ and $S_4$ along a transverse axis X which passes through the geometric center C at right angles to axis Y is a pair of electrode holders 13 and 14 supporting electrodes 15 and 16, respectively.

The frame in combination with the electromagnets and the electrode holders supported thereby form a frame assembly. The entire assembly is encapsulated within a generally cylindrical insulating body 17 formed of polymeric material of high strength. The body has a longitudinal bore 18 therein to define a flow conduit whose longitudinal flow axis passes through the geometric center of the frame and is perpendicular both the transverse axis Y and transverse axis X. The faces of electrodes 15 and 16 are exposed to make contact with the fluid flowing through conduit 18.

Ferromagnetic frame 10 provides a magnetic return path for electromagnets 11 and 12. These are connected to an excitation source 19 to generate magnetic flux whose lines extend through the flow conduit in paths substantially parallel to the transverse axis Y and mutually perpendicular to the longitudinal axis of the flow conduit and to the transverse axis X along which the electrodes are located.

Hence when fluid to be metered flows through the conduit 18 and intersects the magnetic lines of flux, a voltage will be induced therein as a function of the flow rate of the fluid. This voltage is sensed by electrodes 15 and 16 to provide a flow rate signal at terminals $T_1$ and $T_2$ connected thereto.

Preferred Embodiment

Figure 2:
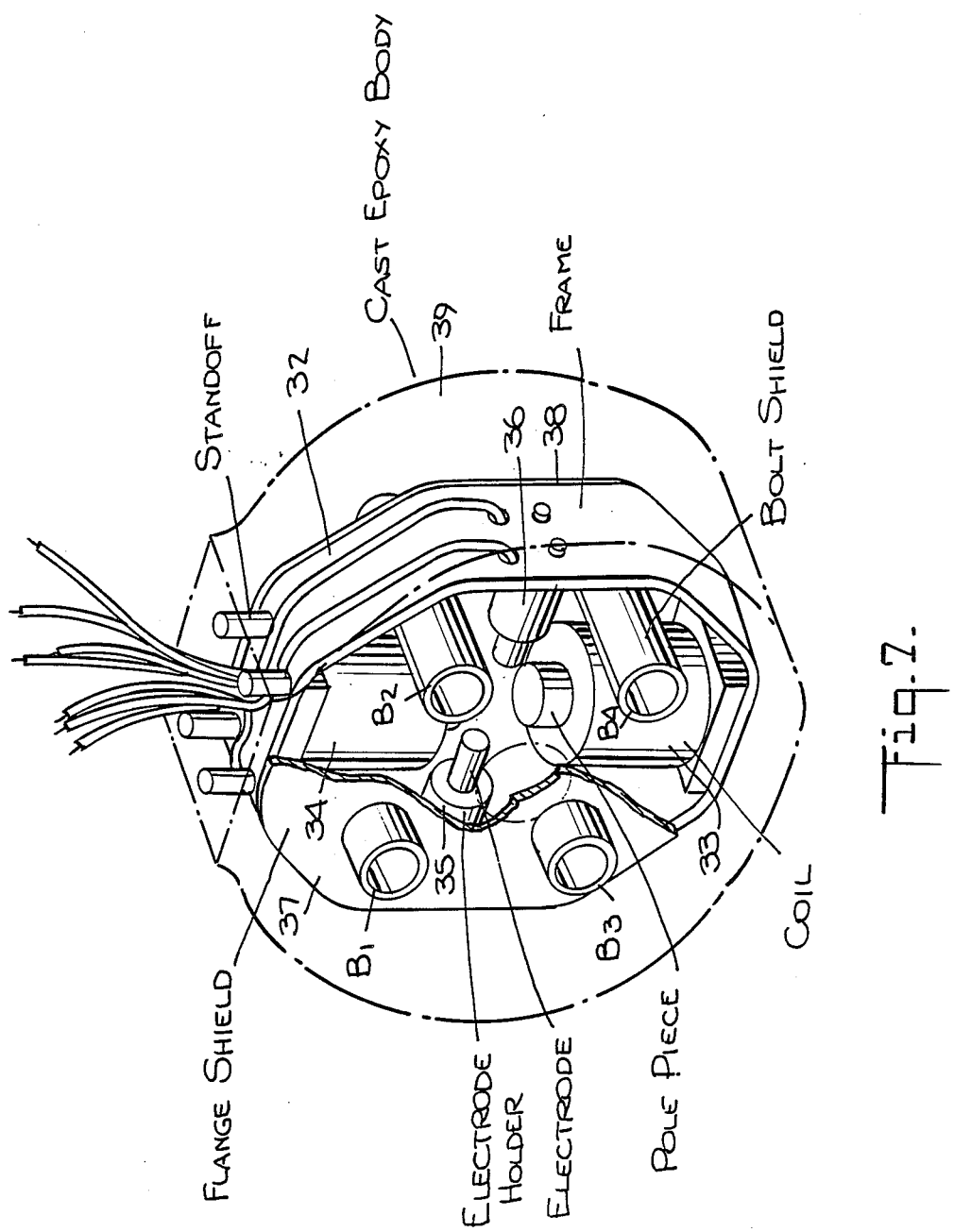
FIG. 2 is a perspective view of the frame assembly of the meter.

Referring now to FIGS. 2 and 3 which shows the structure of a preferred embodiment of the frame assembly it will be seen that electromagnets 11 and 12 make use of saddle-shaped coils and arcuate pole pieces $P_1$ and $P_2$. Pole piece $P_1$ is supported at the free end of a ferromagnetic core 20 which passes through the center coil 11 and is anchored by a screw or other means on side $S_1$ of the frame. Pole piece $P_2$ is supported on the free end of a core 21 which passes through the center of coil 12 and is anchored on side $S_2$ of the frame.

While saddle-shaped electromagnet coils are shown, in practice the electromagnets may be in the form of cylindrical solenoids whose cores are attached to opposing sides of the metal frame. Holders 13 and 14 are secured by screws or other means to the opposing sides 13 and 14 of the frame.

Electrodes 15 and 16 may be formed of any suitable conductive material suitable for flowmeter applications. A preferred material for the electrodes is a vitreous carbon rod, for it possesses both excellent electrical conductivity and chemical resistivity to fluids being metered which are corrosive. Because the material is highly brittle, a vitreous carbon rod cannot safely be press fit or attached by a set screw to the socket of the electrode holder. Hence the end of the vitreous carbon rod to be inserted into the socket of a metal electrode holder made of copper or similar material is provided with a lead bushing, and after the end of the rod is inserted into the socket, the socket is compressed to squeeze the dead soft lead bushing and lock the electrode rod therein.

It will be seen in FIGS. 2 and 3 that secured to the uppermost side $S_1$ of the frame is an array of four stand-off posts 22. These support a mounting plate 23 having a center bore 24 therein through which pass the leads 25 from the electromagnets and the electrodes. The stand-off posts are embedded in an upward projection 17A of the molded cylindrical body 17, which projection has a rectangular crossection.

The purpose of mounting plate 23 which rests on the upper flat surface of projection 17A is to support a container (not shown) housing a secondary including external amplifiers and signal processing circuits connected to the components of the flowmeter primary through leads 24.

Molding

A magnetic flowmeter must be capable of operating under a broad range of environmental conditions so that the meter is capable of withstanding extreme changes in temperature running from −40° to well above +100 degrees C.

It is essential therefore in an encapsulated flowmeter of the present type that no cracking occur in the insulating body of the meter, for even a small crack will permit liquid seepage resulting in meter failure.

The problem of cracking arises from the fact that the thermal coefficient of linear expansion of the ferromagnetic metal frame, such as a carbon steel frame, and most epoxies used as molding compounds to form the insulating body of the meter differ by a factor of 8 to 10. Hence when environmental temperatures are well below ambient, the epoxy which is contained within the carbon steel frame seeks to shrink away therefrom and the stresses which then develop will exceed the bond strength between the metal and the epoxy, resulting in failure at the interface therebetween.

If therefore one were to encapsulate the frame assembly within an insulating body molded of a polymer resin so that the resin becomes directly bonded to the metal frame, then due to radical differences in the thermal coefficients of these materials, the stresses developed at the interface in an environment which is thermally cycled from −40° C. to +120° C. would result in stresses at the interface of the materials that exceeded with the bond strength or the tensile strength of the polymer resins or both. This would give rise to failures in the form of interfacial separation or random fracture of the cured resin.

In order to prevent such failures, before the frame assembly is encapsulated in the resin body, it is first coated with a thin layer of an elastomeric material compatible with the molding resin used to make the body, the coating covering the entire assembly except for the face of the electrodes. The coated frame assembly is thereafter placed in a mold and the molding resin then bonds to the layer which forms an elastomeric interface between the frame assembly and the molded insulating body which encapsulates the assembly.

This interfacial layer is illustrated in FIG. 4 where it will be seen that the layer 26 is interbonded between metal frame 10 and insulating body 17. Thus as body 17 and metal layer 10 in response to an environmental thermal change differentially expand or contract, the interfacial layer 17 is compressed or expanded to the extent dictated by this change, and thereby maintains the integrity of the body to prevent fracture thereof.

In practice, the entire frame assembly after it is coated with the protective layer, is supported by means of standoff posts 22 anchored on the side $S_1$ of frame 10 in a cantilevered position in a mold cavity, the molding resin being then poured into the cavity to form the insulating body 17 which encapuslates the assembly. This resin may be a potting compound such as an epoxy resin of the reactive type forming a tight cross-linked polymer network characterized by toughness, good adhesiveness, corrosion and chemical resistance as well as good dielectric properties. Or the epoxy compound may be a thermosetting resin based on the reactivity of the epoxide group or from polyolefins oxidized with peracetic acid.

The coating layer is preferably of elastomeric polyurethane. Before the layer is coated, the frame assembly may be primed by a primer adhesive such as THIXON made by Dayton Chemical Products Laboratories, this being an adhesive composed of mixtures of rubber and other bonding agents in solvents and normally used in bonding rubber to metal or plastics.

In practice, the layer is coated on the frame assembly to a thickness of about 8 mils. A commercial coating material which is usable for forming the elastomeric layer is Dow Corning 1-2577. Among suitable potting compounds for molding the insulating body are Palmer chocktite, 3M-5064 and Master Bond EP 36 SP A-3.

Mounting

As shown in FIG. 5, the encapsulated flangeless flowmeter having a molded body 17, when installed is compression mounted between the mounting flanges 27F and 28F of the upstream and downstream pipes 27 and 28 in a process line. Compression is effected by an array of bolts 29 which bridge the mounting flanges and encage the flowmeter. In practice, the insulating body of the meter may be formed with an array of internal longitudinal bores to receive the mounting bolts, or the periphery of the body may be formed with longitudinal notches for this purpose.

Second Embodiment

The embodiment of the flowmeter shown in FIG. 7 is designed to be compression-mounted by means of mounting bolts which extend through internal holes in the insulating body of the meter, the bolts being received in a circle of holes in the end flanges of the upstream and downstream pipes between which the flowmeter is interposed. The basic flowmeter structure is very similar to that of the first embodiment and includes an octagonal ferromagnetic frame 32. A pair of solenoid-type electromagnets 33 and 34 are mounted within the frame on one set of opposing sides thereof. Also included is a pair of electrode holders 35 and 36 having electrodes supported thereby mounted within the frame on another set of opposing sides. The front and rear ends of the frame are covered by metal shields 37 and 38, thereby completing the frame assembly.

The entire frame assembly is encapsulated within a generally cylindrical, cast epoxy body 39 having a longitudinal bore therein (not shown) to define a flow conduit through which the fluid to be metered is conducted. The fluid intercepts the lines of flux of the magnetic field established by the electromagnets to induce an electrical signal in the fluid which is picked up by the electrodes.

Embedded in insulating body 39 and projecting through shields 37 and 38 is an array of four equi-spaced metal bushings $B_1$, $B_2$, $B_3$ and $B_4$ which lie on a circle corresponding to the circle of bolt holes on the pipe flanges between which the meter is interposed. These bushings are made of ferromagnetic material and serve not only to provide holes to receive the mounting bolts, but they act also to magnetically shield the internal structure of the meter from the mounting bolts so that the insertion of the bolts does not upset the function or calibration of the meter.

While there has been shown and described a preferred embodiment of an encapsulated electromagnetic flowmeter in accordance with the invention, it will be appreciated that many changes and modifications may be made therein without, however, departing from the essential spirit thereof. Thus in the case of the FIG. 7 embodiment which makes use of solenoid coils, one may instead use saddle-shaped coils to provide the necessary magnetic field.

I claim:

1. A electromagnetic flowmeter comprising:
   A. a metal frame formed of ferromagnetic material and having at least two sets of opposing sides, one set being normal to a first transverse axis passing through the geometric center of the frame, the other set being normal to a second transverse axis passing through said center at right angles to the first axis;
   B. a pair of electromagnets mounted within said frame on said one set of opposing sides whereby said frame functions as a magnetic return path therefor;
   C. a pair of electrode holders mounted within said frame on said other set of opposing sides, said holders having electrodes projecting therefrom provided with end faces; said frame together with the electromagnets and electrode holders mounted thereon constituting a frame assembly; and
   D. a molded plastic insulating body encapsulating said frame assembly and having a longitudinal bore therein to define a flow conduit whose flow axis passes through said center and is normal both to the first and second transverse axes, said electrode faces being exposed to a fluid flowing through said conduit whereby when said fluid intersects a magnetic field produced by said electromagnets a voltage is induced therein which is sensed by the electrodes, said two sets of sides being included in a frame having an octagonal shape and said body has a cylindrical shape.

2. A flowmeter as set forth in claim 1 wherein said electromagnets include saddle-shaped coils.

3. A flowmeter as set forth in claim 1 wherein said body is molded of a polymer resin.

4. A flowmeter as set forth in claim 3 wherein said frame assembly is coated with a layer of elastomeric material which is interbonded between the assembly and the body to prevent cracking of the body as a result of differential thermal expansion of the metal frame and the plastic body.

5. A flowmeter as set forth in claim 4 wherein said layer has a thickness of about 8 mils.

6. A flowmeter as set forth in claim 4 wherein said layer is formed of polyurethane.

7. A flowmeter as set forth in claim 1 wherein said body includes a projection within which is encapsulated an array of standoff posts anchored on one side of the frame to support a mounting plate on the exposed end surface of the projection.

8. A flowmeter as set forth in claim 7 further including leads from the electromagnets and the electrodes which are embedded in said body and pass out of the body through an opening in the mounting plate.

9. A flowmeter as set forth in claim 1, wherein said electromagnets include bobbin coils.

10. A flowmeter as set forth in claim 1, for installation between upstream and downstream pipes each having an end flange provided with a circle of bolt holes, said flowmeter further including a plurality of holes extending through said body in parallel relation to the bore therein and positioned at equi-spaced points on a circle corresponding to said circle of bolt holes to receive bolts for mounting the flowmeter.

11. A flowmeter as set forth in claim 10, wherein said holes are defined by ferromagnetic bushings.

* * * * *